July 31, 1945. R. A. TERRY 2,380,557
VEHICLE BODY UNIT
Filed Nov. 15, 1943 3 Sheets-Sheet 1
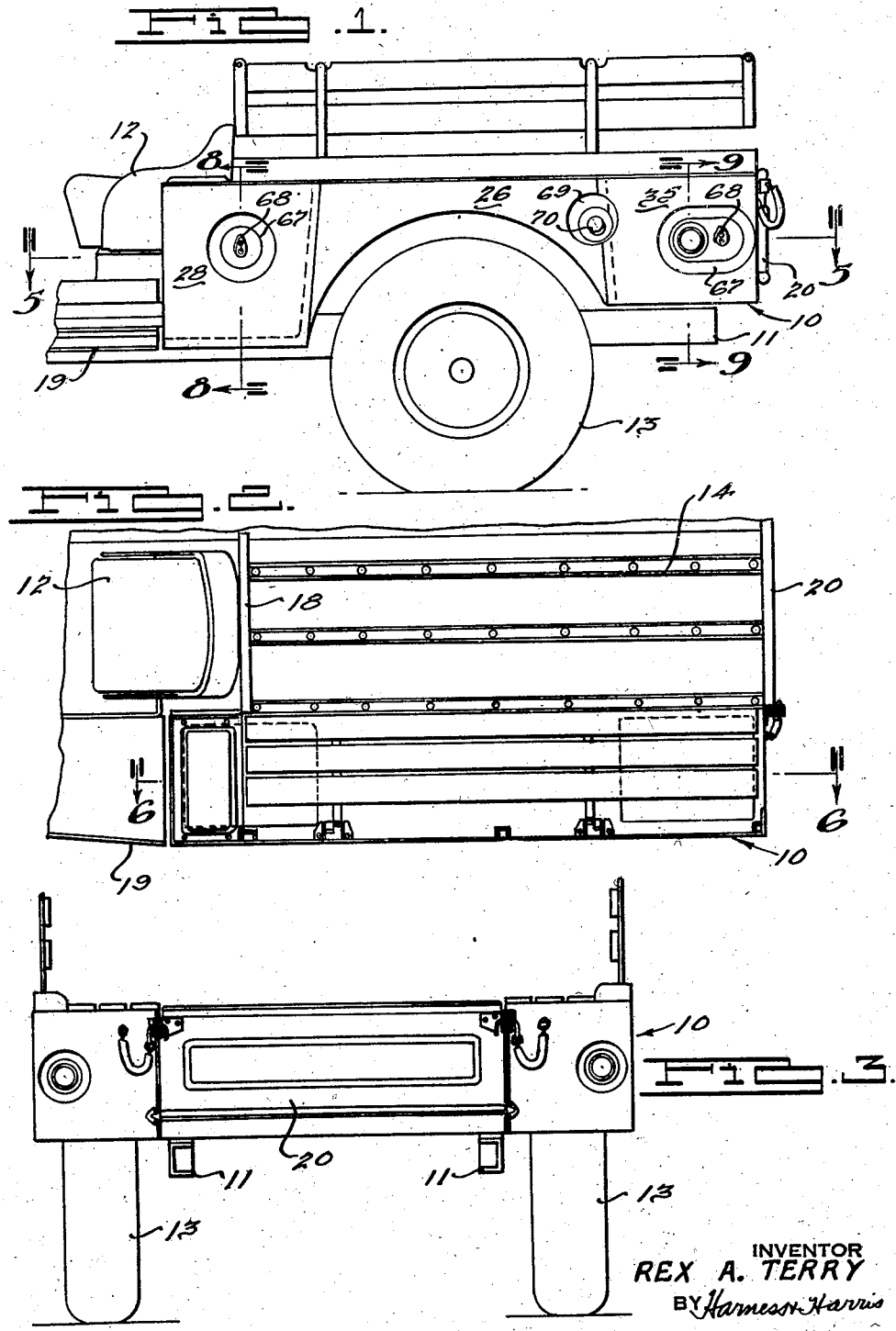
INVENTOR
REX A. TERRY
BY Harness & Harris
ATTORNEYS.

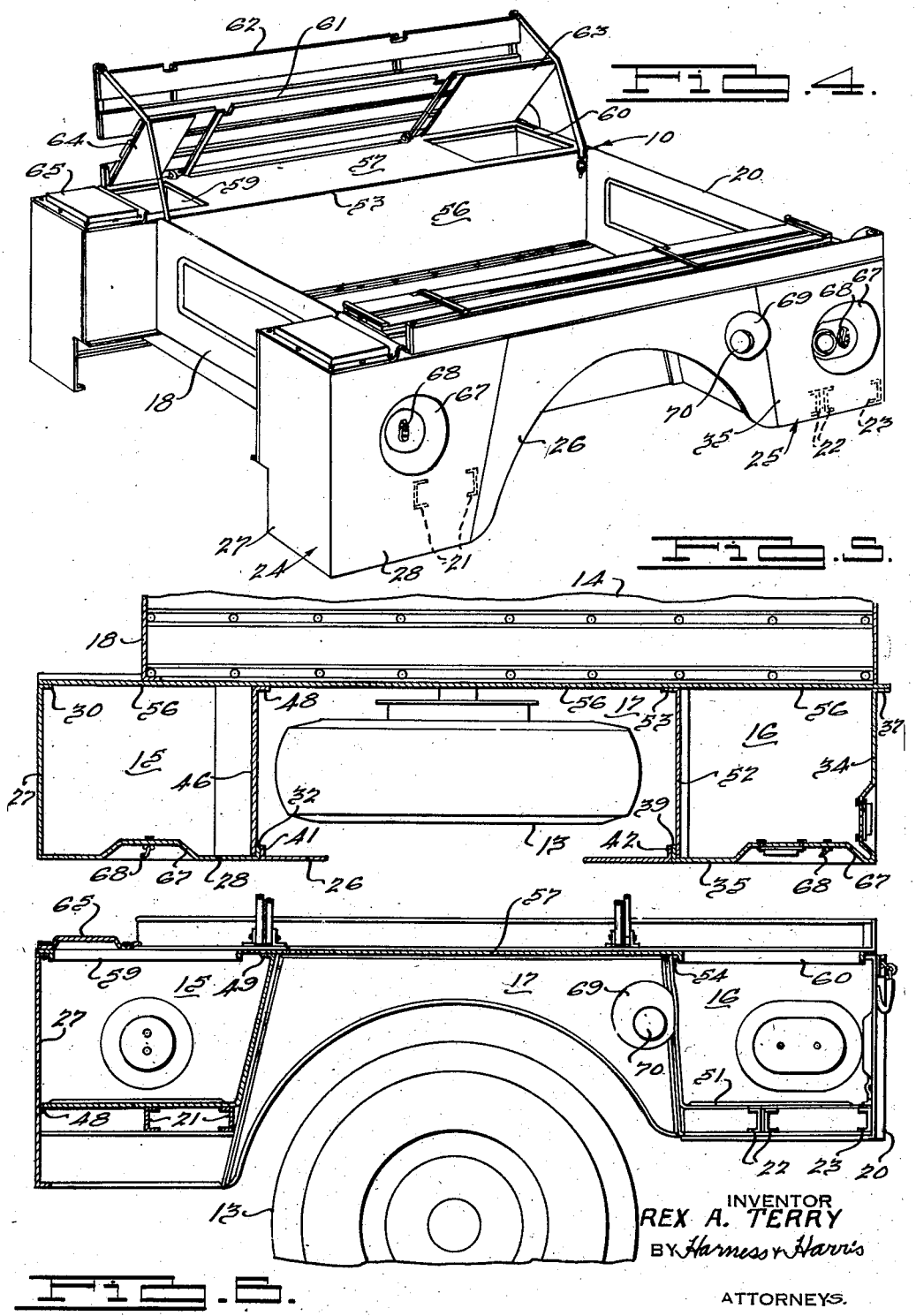

July 31, 1945.  R. A. TERRY  2,380,557
VEHICLE BODY UNIT
Filed Nov. 15, 1943   3 Sheets-Sheet 3
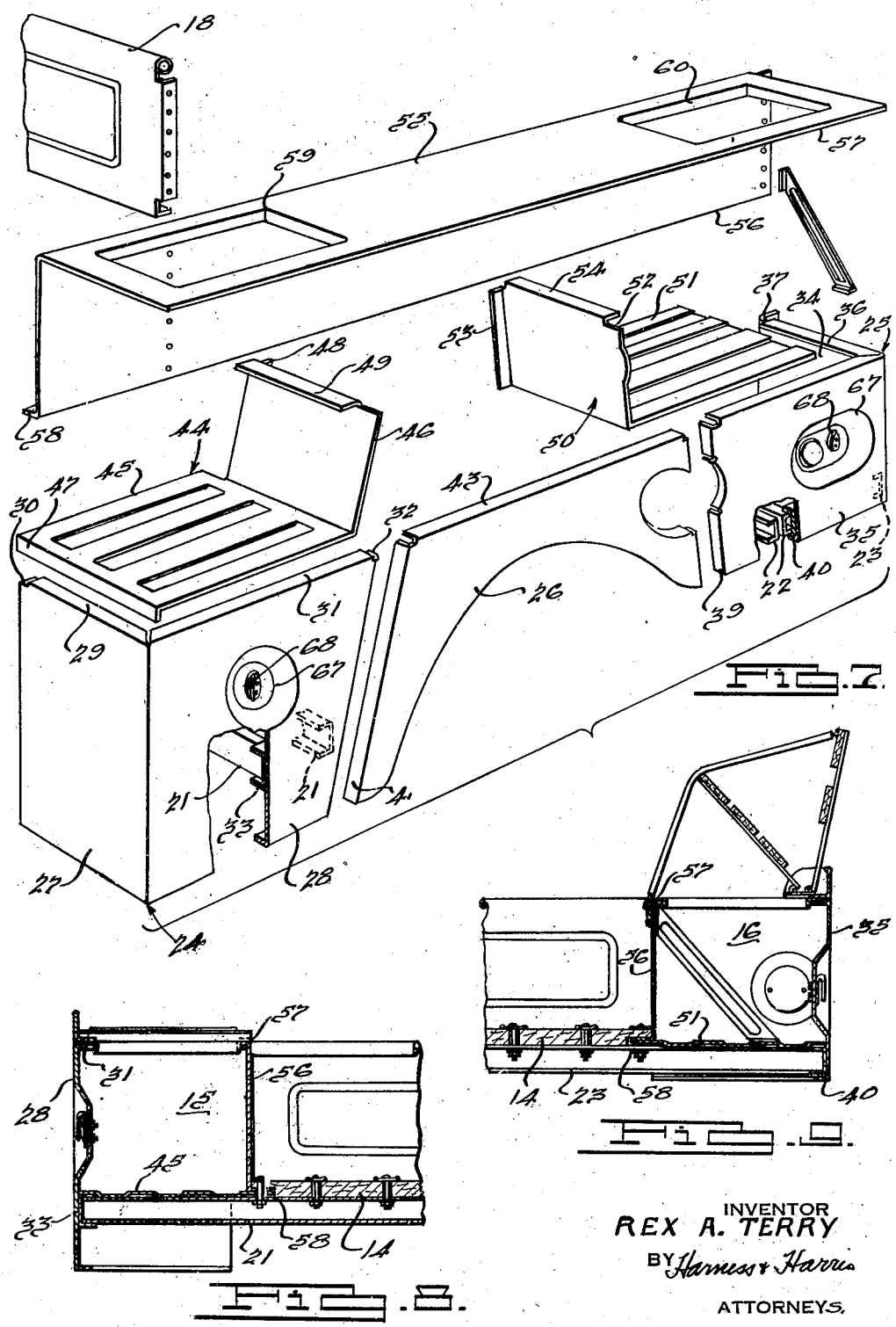
INVENTOR
REX A. TERRY
BY *Harness & Harris*
ATTORNEYS.

Patented July 31, 1945

2,380,557

UNITED STATES PATENT OFFICE 2,380,557

VEHICLE BODY UNIT

Rex A. Terry, Berkeley, Mich., assignor to Chrysler Corporation, Highland Park, Mich., a corporation of Delaware Application November 15, 1943, Serial No. 510,294

7 Claims. (Cl. 296—24)

This invention relates to improvements in a motor vehicle body unit and particularly to a unit for a commercial vehicle.

An object of the invention is the provision of a body unit having a cargo carrying space and storage compartment space at either side thereof in conjunction with the provision of passenger seating space.

Another object of the invention is the provision of a body unit fabricated from structural components embodying a novel design minimizing the number of such components and facilitating assembly thereof, particularly by welding operation.

A further object of the invention is the provision of a body unit which can be readily adapted to a vehicle chassis of conventional commercial design.

Other objects and advantages of the invention will be more apparent from the following description taken in connection with the accompanying drawings, wherein:

Fig. 1 is a fragmentary side elevational view of a vehicle equipped with the improved body unit.

Fig. 2 is a fragmentary top plan view of the vehicle shown in Fig. 1.

Fig. 3 is an end elevational view of the vehicle of Figs. 1 and 2.

Fig. 4 is a view in perspective of the vehicle body unit of Figs. 1, 2 and 3.

Fig. 5 is a fragmentary longitudinal sectioned view taken as indicated by the line 5—5 of Fig. 1, and showing a typical side construction of the body unit.

Fig. 6 is a longitudinal sectional view of a typical side construction of the body unit, the section being taken and viewed according to line 6—6 of Fig. 2.

Fig. 7 is a view mainly in perspective showing certain of the component parts of a typical side construction prior to final assembly.

Figs. 8 and 9 are fragmentary sections respectively taken as indicated by the lines 8—8 and 9—9 of Fig. 1.

Referring to the drawings, the improved body unit shown in Fig. 4 and generally designated by the numeral 10, is mounted on the chassis frame 11 immediately to the rear of the seat structure 12 and projects laterally beyond the rear road wheels 13 of the vehicle.

The body unit 10 includes a floor structure 14 and a box-like structure at either side thereof, as typified in Figs. 5 and 6, wherein it will be noted that the latter structure includes front and rear compartments 15 and 16, respectively, and an intermediate wheelhouse 17. A front cross wall 18 extends between the compartments 15 and is positioned rearwardly of the forward extremities of the latter in order that these compartments may extend forwardly of the seat structure 12, the top of each compartment providing a seat longitudinally aligned with the adjacent running board 19 as shown more particularly in Fig. 2. A swinging gate 20 extends between the rear compartments 16.

The floor structure 14 is mounted on a plurality of transversely extending sills channel-shaped in cross-section, a pair of such sills 21 opening one toward the other and registering with the front compartments 15, as shown more particularly in Fig. 6. A second pair of sills 22 arranged in back-to-back relation register with the rear compartments 16, and a third sill 23 extends between the rear extremities of the latter compartments and carries a hinge connection (not shown) with the tail gate 20. Each of the aforesaid sills has cantilever-like parts respectively projecting beyond the opposite lateral extremities of the floor structure for supporting the box-like structure, as more particularly shown in Figs. 8 and 9.

Referring to Fig. 7, the aforesaid sills are shown in an assembled relation with respect to other structural components of a typical box-like structure at one side of the unit, such components being illustrated in non-assembled relation one relative to the other in order to more clearly portray the design thereof. Each box-like structure includes front and rear corner panels 24 and 25 respectively and an intermediate panel 26. The panel 24 is an integral unit preferably a one-piece sheet metal stamping and provides the forward end wall 27 and a side wall 28 of the compartment 15. The wall 27 has inturned top and side flanges 29 and 30, respectively, and the wall 28 has a top flange 31 aligned with the flange 29 and a flange 32 at the side thereof. A channel-shaped support 33 extending longitudinally of the vehicle and abutting the inner surface of the wall 28 is secured to the latter as by welding and receives therein the adjacent end of the pair of sills 21 for support by the latter.

The rear corner panel 25 is an integral unit, preferably a one-piece sheet metal stamping and provides the rear end wall 34 and a side wall 35 for the compartment 16. The wall 34 has a top flange 36 and a side flange 37, and the wall 35 has a top flange 38 and a side flange 39, the flanges 37, 38, and 39 being inturned and the flange 37 being turned outwardly. A channel shaped member 40 is carried by the wall 35 interiorly of the compartment 16 and receives therein the adjacent ends of the sills 22 and 23.

The exterior side wall of the box-like structure is provided by the walls 28 and 35 in conjunction with the panel section 26, the latter having an inturned flange 41 at the forward extremity thereof which abuts and is welded to the flange 32 and a similar flange 42 at the rear extremity thereof (see Fig. 5) which abuts and is welded to the flange 39. The inturned flange 43 of the section 26 is in vertical alignment with the flanges 29, 31, 36, and 38 for the purpose hereinafter set forth.

The bottom and other end wall of the compartment 15 are provided by an integral component 44, preferably a sheet metal stamping having the bottom and end wall forming parts 45 and 46 respectively. The bottom part 45, as shown in Fig. 8, rests upon the sills 21 and the member 33, and has a down-turned flange 47 which abuts the inner surface of the wall 27 (see Fig. 6) and is welded thereto. The end wall forming part overlaps the flange 32 (see Fig. 5) and is welded thereto and the opposite end portion of this part has the free edge flanged as at 48 and is further provided with a top flange 49 aligned vertically with the top flanges of the sections 24, 25, and 26. As shown in Fig. 8, the innermost side edge portion of the wall 45 extends beneath the adjacent edge of the floor. It will be noted that the wall 46 constitutes a partition between the compartment 15 and wheelhouse 17.

A unitary member 50, preferably a steel metal stamping, has parts 51 and 52 respectively forming the bottom and other end wall of the compartment 16, the part 51 resting upon the sills 22 and 23 and the member 40 and having an edge portion overlapping the adjacent edge of the floor, as shown in Fig. 9. The part 52 has an edge portion thereof overlapping and welded to the flange 39, the opposite edge being flanged as at 53 and the top thereof having a flange 54 aligned vertically with the flange 49 and the top flanges of the sections 24, 25, and 26. The part 52 provides a partition between the compartment 16 and wheelhouse 17.

The innermost side wall and top for the compartments 15, 16 and wheelhouse 17 are provided by an integral component 55, preferably a sheet metal stamping, the part 56 forming said side wall and the part 57 forming said top. As shown in Fig. 5, the part 56 abuts the flanges 30, 48, 53, and 37 and is secured thereto as by welding, this part having a flange at 58 at the free edge thereof which, as shown in Figs. 8 and 9, extends beneath the adjacent edge of the floor and together with the parts 45 and 51 are bolted to the floor and sills. The part 57 rests upon the top flanges 29, 31, 49, 43, 54, 38, 36, and is suitably secured thereto as by welding. Openings 59 and 60 provide access to the respective compartments 15 and 16. The wall 18 has a flange at each of its opposite ends which abuts and is secured as by riveting or welding to the adjacent wall forming part 56.

Each box-like structure has a swinging seat 61 and a swinging back rest 62, the seat 61 carrying a cover 63 for the opening 60 and a second cover 64, which, in cooperation with the seat forming cover 65, closes the opening 59. If desired, the vehicle body unit may be provided with a removable cover such as a fabric tarpaulin and for this purpose each side panel wall 28, 35 is indented as shown at 67 to receive a suitable hook 68 fixed in the indentation and thereby avoid lateral projections. As a further feature in this direction, the exterior side wall has a portion thereof indented at 69 with an opening 70 therethrough adapted to receive a fuel tank filler pipe (not shown).

Although but one specific embodiment of the invention has herein been shown and described, it will be understood that various changes in the size, shape and arrangement of parts may be made without departing from the spirit of the invention.

I claim:

1. In a motor vehicle body unit having a pair of storage compartments at either side thereof and a wheelhouse intermediate each pair of compartments; a first unitary section constituting end and exterior side panels for a compartment, each of said panels having a flange at the top extremity thereof; a side wall panel constituting the exterior side wall of the wheelhouse extending between and aligned with said side panels and attached thereto, said side wall panel having a flange at the top extremity thereof aligned with the flanges of the end and side panels; a second unitary section extending between and secured to said end panels constituting the interior side panel and top panel for a pair of compartments at one side of the vehicle and the interior wall for that wheelhouse intermediate the last mentioned compartments, the top forming panel of said unitary section resting on said aligned flanges, each compartment of said pair further including a third unitary section having a first part thereof received within the confines of the first and second sections constituting a compartment bottom wall and an upstanding second part constituting a common wall for the compartment and wheelhouse, each of said second parts having the upper extremity thereof arranged in supporting relation with respect to said top panel.

2. In a motor vehicle body unit including a floor structure and transversely disposed sills having portions thereof respectively extending laterally beyond opposite extremities of the floor structure; front and rear unitary corner sections at either side of the floor structure each defining an end wall panel and a side wall panel; a channel member secured to each of said side wall panels and receiving an end portion of an adjacent sill therein for support thereby; a side wall panel extending between and aligned with said side wall panels and secured thereto; a unitary section extending between and secured to the end panels of a pair of front and rear unitary corner sections projecting above said floor structure and cooperating with said pair of front and rear unitary corner sections to define a box-like structure; means securing said unitary section to certain of said sills; and a pair of unitary structural parts respectively associated with said pair of front and rear unitary corner sections each including a horizontal portion received within the confines of the associated corner section and said unitary section seated on the lateral extension of one of said sills and secured to the latter, and a generally upright portion secured to the side panel of the associated corner section and to said unitary section, each of said upright portions constituting a partition wall for said box-like structure.

3. In a motor vehicle body unit including a floor structure and transversely disposed sills having portions thereof respectively extending laterally beyond opposite extremities of the floor structure; front and rear unitary corner sections at either side of said floor structure supported by said sill portions, each of said sections defining an end wall panel and a side wall panel; a side wall panel extending between and aligned with said side wall panel and secured thereto; a unitary section extending between and secured to the end panels of a pair of front and rear unitary corner sections projecting above said floor structure and cooperating with said pair of front and rear unitary corner sections to define a box-like structure; and a pair of unitary structural parts respectively associated with said pair of front and rear unitary corner sections each including a horizontal portion received within the confines of the associated corner section and said unitary section forming a bottom wall and seated on the lateral extension of one of said sills and secured to the end wall panel of the associated corner section, and a generally upright portion each constituting a partition wall for said box-like structure and secured to the side wall panel of the associated corner section.

4. In a motor vehicle body unit including a floor structure and transversely disposed sills having portions thereof respectively extending laterally beyond opposite extremities of the floor structure; front and rear unitary corner sections at either side of said floor structure supported by said sill portions, each of said sections defining an end wall panel and a side wall panel, a side wall panel extending between and aligned with said side wall panels and secured thereto; a unitary section extending between and secured to the end panels of a pair of front and rear unitary corner sections projecting above said floor structure and cooperating with said pair of front and rear unitary corner sections to define a box-like structure; and a pair of unitary structural parts respectively associated with said pair of front and rear unitary corner sections each including a horizontal portion received within the confines of the associated corner section and said unitary section and supported on the lateral extension of one of said sills, and a generally upright portion each constituting a partition wall for said box-like structure.

5. In a motor vehicle body unit including a floor structure and transversely disposed sills having portions thereof respectively extending laterally beyond opposite extremities of the floor structure; front and rear unitary corner sections at either side of said floor structure supported by said sill portions, each of said sections defining an end wall panel and a side wall panel; a side wall panel extending between and aligned with said side wall panels and having inturned flanges respectively secured to the inturned flanges of said side wall panels; a unitary section extending between and secured to the end panels of a pair of front and rear unitary corner sections projecting above said floor structure and cooperating with said pair of front and rear unitary corner sections to define a box-like structure; and a pair of unitary structural parts respectively associated with said pair of front and rear unitary corner sections each including a horizontal portion received within the confines of the associated corner section and said unitary section and seated on the lateral extension of one of said sills each said horizontal portion having a flange abutting and secured to the associated end wall panel, each of said unitary structural parts further including a generally upright portion each constituting a partition wall for said box-like structure and being secured to the associated side wall panel.

6. In a motor vehicle body unit having compartments spaced longitudinally of the vehicle and a wheelhouse therebetween; each of said compartments including a first sheet metal stamping having angularly disposed parts respectively constituting end and side panels; a second sheet metal stamping including angularly disposed parts one thereof attached to said end panel and constituting a compartment bottom and the other thereof forming a common wall for the compartment and wheelhouse and attached to said side panel; a side wall panel section constituting the exterior side wall of the wheelhouse extending between and aligned with said side panels and attached thereto; and a unitary sheet metal member including angularly disposed parts, one thereof forming another side panel for said compartments and a wall of the wheelhouse and attached to said end panels, and the other of said parts overlying said end and side panels and said panel section forming a cover for the wheelhouse and compartments and having openings therein respectively providing access to the compartments.

7. In a motor vehicle body unit having compartments spaced longitudinally of the vehicle and a wheelhouse therebetween; each of said compartments including a first sheet metal stamping having angularly disposed parts respectively constituting end and side panels, each having a flange at the top and side face thereof; a second sheet metal stamping including angularly disposed parts one thereof attached to said end panel and constituting a compartment bottom and the other thereof forming a common wall for the compartment and wheelhouse and attached to said side panel; a side wall panel section constituting the exterior side wall of the wheelhouse extending between and aligned with said side panels and having terminal flanges respectively secured to the flange at the side face of said side panels; and a unitary sheet metal member including angularly disposed parts, one thereof forming another side panel for said compartments and a wall of the wheelhouse, said one part abutting the side flange of said end panels and being secured thereto, and the other of said parts overlying said end and side panels and said panel section forming a cover for the wheelhouse and compartments and having openings therein respectively providing access to the compartments, said other part engaging said top flange of said end and side panels and being secured thereto.

REX A. TERRY.